(12) United States Patent
Rong et al.

(10) Patent No.: US 12,199,446 B1
(45) Date of Patent: Jan. 14, 2025

(54) CAPACITIVE COUPLER WITH ASYMMETRIC INSULATING LAYERS AND WIRELESS POWER TRANSFER SYSTEM

(71) Applicant: NAVAL UNIVERSITY OF ENGINEERING, Wuhan (CN)

(72) Inventors: Enguo Rong, Wuhan (CN); Pan Sun, Wuhan (CN); Xusheng Wu, Wuhan (CN); Gang Yang, Wuhan (CN); Xiaochen Zhang, Wuhan (CN); Lei Wang, Wuhan (CN); Yan Liang, Wuhan (CN); Haomin Shen, Wuhan (CN); Leyu Wang, Wuhan (CN)

(73) Assignee: NAVAL UNIVERSITY OF ENGINEERING, Wuhan (CN)

( * ) Notice: Subject to any disclaimer, the term of this patent is extended or adjusted under 35 U.S.C. 154(b) by 0 days.

(21) Appl. No.: 18/781,903

(22) Filed: Jul. 23, 2024

(30) Foreign Application Priority Data

Aug. 2, 2023 (CN) .......................... 202310962384.4

(51) Int. Cl.
| | | |
|---|---|---|
| *H02J 7/00* | (2006.01) | |
| *H02J 50/00* | (2016.01) | |
| *H02J 50/05* | (2016.01) | |
| *H02J 50/40* | (2016.01) | |
| *B60L 53/10* | (2019.01) | |

(52) U.S. Cl.
CPC ............ *H02J 50/05* (2016.02); *H02J 50/005* (2020.01); *H02J 50/402* (2020.01); *B60L 53/10* (2019.02); *B60L 2200/32* (2013.01)

(58) Field of Classification Search
CPC ........ H02J 50/05; H02J 50/005; H02J 50/402; B60L 53/10; B60L 2200/32
USPC .................................. 320/108; 307/104, 109
See application file for complete search history.

(56) References Cited

U.S. PATENT DOCUMENTS

| | | | |
|---|---|---|---|
| 2015/0270720 A1* | 9/2015 | Takahashi | H02J 50/12 |
| | | | 307/104 |
| 2016/0372978 A1 | 12/2016 | Ichikawa et al. | |
| 2018/0278097 A1* | 9/2018 | Yamamoto | H02J 50/05 |
| 2021/0143673 A1* | 5/2021 | Ahn | B64U 50/37 |
| 2021/0392005 A1 | 12/2021 | Barzegar et al. | |
| 2023/0361599 A1 | 11/2023 | Podhola | |

* cited by examiner

*Primary Examiner* — Zixuan Zhou

(57) ABSTRACT

A capacitive coupler with asymmetric insulating layers includes a coupler transmitting side and a coupler receiving side. The coupler transmitting side includes a first insulating cavity, and a first plate and a second plate that are arranged on a first plane. The first insulating cavity is configured to enclose the first plate and the second plate with an insulating material. The coupler receiving side is arranged opposite to the coupler transmitting side and includes a second insulating cavity, a third plate and a fourth plate that are arranged on a second plane. The second insulating cavity is configured to enclose the third plate and the fourth plate with an insulating material. The first insulating cavity and the second insulating cavity have asymmetric insulating layers. The capacitive coupler can improve the power transfer efficiency and reduce the safety distance of the electric field.

10 Claims, 9 Drawing Sheets

CAPACITIVE COUPLER WITH ASYMMETRIC INSULATING LAYERS AND WIRELESS POWER TRANSFER SYSTEM

CROSS-REFERENCE TO RELATED APPLICATIONS

This application claims priority to Chinese Patent Application No. 202310962384.4 with a filing date of Aug. 2, 2023. The content of the aforementioned application, including any intervening amendments thereto, is incorporated herein by reference.

TECHNICAL FIELD

The present disclosure relates to the technical field of wireless power transfer, and in particular to a capacitive coupler with asymmetric insulating layers and a wireless power transfer system.

BACKGROUND

In recent years, with the rapid development of battery and electronic control technology, the application of full electric ships has become increasingly extensive. Compared to conventional oil-powered ships, electric ships offer advantages such as stronger power, lower operation and maintenance costs, and reduced environmental pollution. However, ship charging has emerged as a new challenge. The conventional wired charging method suffers from issues like heavy cables, manual handling, and susceptibility to wear and water leakage at charging contacts. Therefore, underwater wireless power transfer technology presents a promising solution for electric ship charging.

Depending on the coupling modes, wireless power transfer technology can be categorized into the magnetic field wireless power transfer and electric field wireless power transfer. Magnetic field wireless power transfer is also called inductive power transfer (IPT), and electric field wireless power transfer is also called capacitive power transfer (CPT). The IPT system requires structures such as coils, ferrites, and shields for the coupler, resulting in higher weight and costs. It also faces challenges in achieving waterproof sealing and withstanding water pressure. On the other hand, the CPT system only necessitates two pairs of plates and insulating layers. This not only reduces weight and costs but also facilitates waterproofing and allows for greater water pressure resistance. Therefore, CPT is highly suitable for underwater wireless charging of electric ships.

However, conventional underwater CPT systems encounter two major issues. Firstly, the transfer efficiency is low due to the low capacitive coupling coefficient of the coupler. Secondly, there is a significant safety distance requirement for electric fields, mainly due to high plate voltages causing electric field radiation.

In the prior art, a six-plate coupler structure has been proposed, to be specific, shielding plates are added outside two pairs of plates on both the transmitting and receiving sides. This design confines the electric field between the shielding plates, effectively reducing the required safety distance. However, the addition of two metal shielding plates in the six-plate coupler increases both cost and weight. Furthermore, the six-plate structure significantly reduces the coupling coefficient of the coupler, further impacting system transfer efficiency.

In the prior art, a vertical capacitive coupler has been further proposed. While occupying less horizontal space compared to horizontal couplers, the vertical capacitive coupler exhibits more pronounced cross-coupling effects, resulting in a lower coupling coefficient. Even dielectric materials with lower relative dielectric constant are filled between adjacent plates on the same side of the vertical capacitive coupler to form the hybrid-dielectric vertical coupler, the coupling coefficient remains inferior to that of horizontal couplers. Moreover, the vertical coupler fails to shield electric fields, leading to substantial electric field radiation.

SUMMARY OF PRESENT INVENTION

The present disclosure provides a capacitive coupler with asymmetric insulating layers and a wireless power transfer system for improving the power transfer efficiency and reducing the safety distance of the electric field.

In one embodiment, a capacitive coupler with asymmetric insulating layers is provided, including:

a coupler transmitting side including a first insulating cavity, and a first plate and a second plate that are arranged on a first plane, where the first insulating cavity is configured to enclose the first plate and the second plate with an insulating material; and a coupler receiving side arranged opposite to the coupler transmitting side and including a second insulating cavity, a third plate and a fourth plate that are arranged on a second plane, where the second insulating cavity is configured to enclose the third plate and the fourth plate with an insulating material, where thickness of an insulating layer of the first insulating cavity facing the coupler receiving side is smaller than thickness of an insulating layer of the first insulating cavity far away from the coupler receiving side; and thickness of an insulating layer of the second insulating cavity facing the coupler transmitting side is smaller than thickness of an insulating layer of the second insulating cavity far away from the coupler transmitting side.

Further, the thickness of the insulating layer of the first insulating cavity facing the coupler receiving side is the same as the thickness of the insulating layer of the second insulating cavity facing the coupler transmitting side, and the thickness of the insulating layer of the first insulating cavity far away from the coupler receiving side is the same as the thickness of the insulating layer of the second insulating cavity far away from the coupler transmitting side.

Further, the thickness of the insulating layer of the first insulating cavity facing the coupler receiving side is denoted as du, the thickness of the insulating layer of the first insulating cavity far away from the coupler receiving side is denoted as $d_{r3}$, and $d_{r3}$ is 9 to 21 times of du.

Further, the first plate, the second plate, the third plate, and the fourth plate are all square and have a same area, the first plate is arranged to face the third plate, the second plate is arranged to face the fourth plate, the first insulating cavity and the second insulating cavity have a same shape and area, and the first insulating cavity is arranged to face the second insulating cavity.

Further, the first plate and the second plate are equidistant from front, rear, left, and right sides of the first insulating cavity, and the third plate and the fourth plate are equidistant from front, rear, left, and right sides of the second insulating cavity.

Further, the first plate and the second plate are arranged separately, and the third plate and the fourth plate are arranged separately.

Further, the first insulating cavity and the second insulating cavity are each an integrally formed rectangular parallelepiped structure or a rectangular parallelepiped structure formed by splicing a plurality of insulating plates.

Further, both the first insulating cavity and the second insulating cavity are made of epoxy materials.

Further, power transfer is achieved between the coupler transmitting side and the coupler receiving side through a transfer medium.

According to a second aspect of the present disclosure, a capacitive wireless power transfer system is further provided, including: the capacitive coupler with asymmetric insulating layers according to any one of the above embodiments; a transmitter circuit including a power supply, an inverter, and a first compensation network, where an output terminal of the power supply is connected to an input terminal of the inverter, and an output terminal of the inverter is connected to the coupler transmitting side through the first compensation network; and a receiver circuit including a second compensation network and a rectifier, where the coupler receiving side is connected to the rectifier through the second compensation network.

Generally, compared with the prior art, the above technical solutions conceived by the present disclosure can achieve the following beneficial effects:

(1) The present disclosure uses the design of asymmetric insulating layers, which achieves enhanced coupling coefficient of the coupler in a simple and cost-effective manner without additional devices or wires. This improvement enhances the transfer efficiency of the system.

(2) The thickness of the asymmetric insulating layers in the non-transfer direction is greater than that in the transfer direction. This design ensures that wireless power transfer remains unaffected while reducing electric field radiation of the coupler into the water. Consequently, the safety distance of the electric field is effectively reduced, thereby enhancing the safety of underwater wireless charging.

(3) The conductive plates are fully covered by the insulating layer, providing functions such as waterproofing, corrosion resistance, electric shock prevention, and leakage prevention. Moreover, the structure can withstand high water pressure, making it highly suitable for underwater wireless charging of electric ships.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
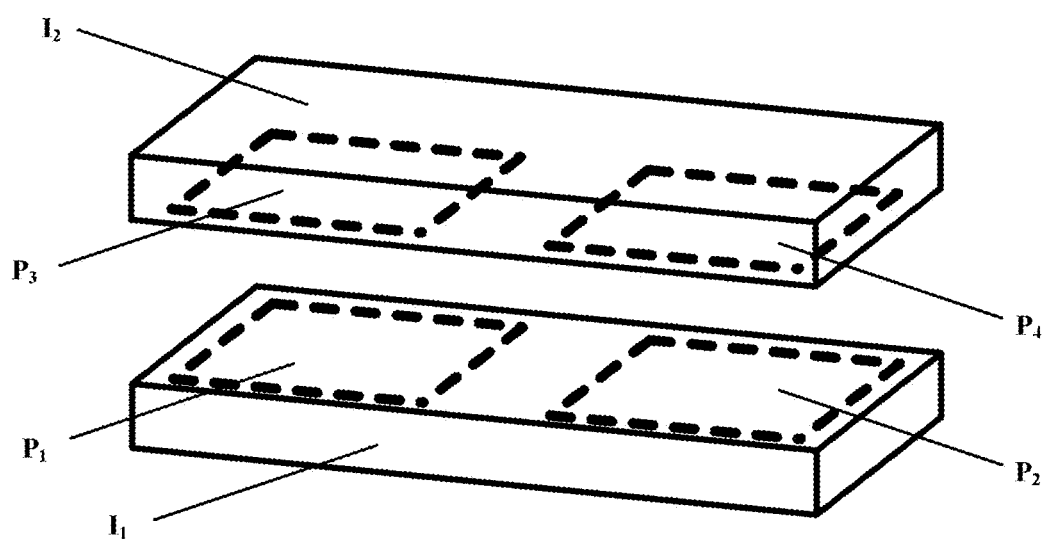
FIG. 1 is a three-dimensional structural diagram of a coupler according to an embodiment of the present disclosure.

REFERENCE NUMERALS $P_1$: first plate; $P_2$: second plate; $P_3$: third plate; $P_4$: fourth plate; $I_1$: first insulating cavity; $I_2$: second insulating cavity; $V_{in}$: transmitter voltage source; $V_{out}$: receiver constant voltage load; $S_1$, $S_2$, $S_3$, and $S_4$: inverter MOSFETs of a wireless power transfer system; $D_1$, $D_2$, $D_3$, $D_4$: rectifier diodes of the wireless power transfer system; $L_1$, $L_2$, $L_3$, and $L_4$: compensation inductors of the wireless power transfer system; $C_{r1}$ and $C_{r2}$: compensation capacitors of the wireless power transfer system; $C_{p1}$ and $C_{p2}$: equivalent parallel capacitors of a coupler in the wireless power transfer system; and $C_S$: equivalent series capacitors of the coupler in the wireless power transfer system.

DETAILED DESCRIPTION OF THE EMBODIMENTS

In order to make the objectives, technical solutions, and advantages of the present disclosure clearer, the present disclosure is further described in detail below with reference to the accompanying drawings and examples. It should be understood that the specific embodiments described herein are merely intended to illustrate the present disclosure and are not intended to limit the present disclosure. Further, the technical features involved in the various examples of the present disclosure described below may be combined with each other as long as they do not constitute a conflict with each other.

The terms "first", "second", "third", "fourth", and the like in the description, claims and the accompanying drawings of the present disclosure are intended to distinguish between different objects but do not indicate a specific sequence. Moreover, the terms "include", "have", and any variations thereof mean to cover non-exclusive inclusion.

Figure 2:
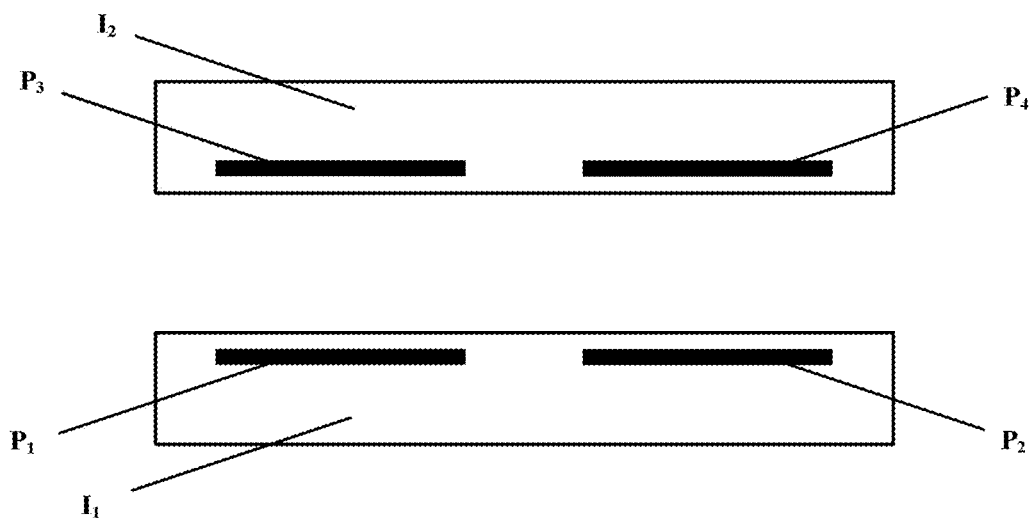
FIG. 2 is a cross-sectional view of a structure of a coupler according to an embodiment of the present disclosure.

As shown in FIG. 1 and FIG. 2, a capacitive coupler with asymmetric insulating layers according to an embodiment of the present invention includes a coupler transmitting side and a coupler receiving side.

The coupler transmitting side includes a first insulating cavity $I_1$, and a first plate $P_1$ and a second plate $P_2$ that are arranged on a first plane. The first insulating cavity $I_1$ is configured to enclose the first plate $P_1$ and the second plate $P_2$ with an insulating material.

The coupler receiving side is arranged opposite to the coupler transmitting side, and includes a second insulating cavity $I_2$, a third plate $P_3$ and a fourth plate $P_4$ that are arranged on a second plane. The second insulating cavity $I_2$ is configured to enclose the third plate $P_3$ and the fourth plate $P_4$ with an insulating material.

The thickness of an insulating layer of the first insulating cavity $I_1$ facing the coupler receiving side is smaller than the thickness of an insulating layer of the first insulating cavity $I_1$ far away from the coupler receiving side.

The thickness of an insulating layer of the second insulating cavity $I_2$ facing the coupler transmitting side is smaller than the thickness of an insulating layer of the second insulating cavity $I_2$ far away from the coupler transmitting side.

The first plate $P_1$, the second plate $P_2$, the third plate $P_3$, and the fourth plate $P_4$ may all be metal plates.

The first insulating cavity $I_1$ and the second insulating cavity $I_2$ are made of insulating materials, and each may be an integrally formed rectangular parallelepiped structure or a rectangular parallelepiped structure formed by splicing a plurality of insulating plates. Regardless of the structural form chosen, the function of each cavity is to completely and securely enclose the plates on the same side of the coupler. Further, the structure ensures that the insulating layers on two sides of the two plates differ in thickness.

Figure 3:
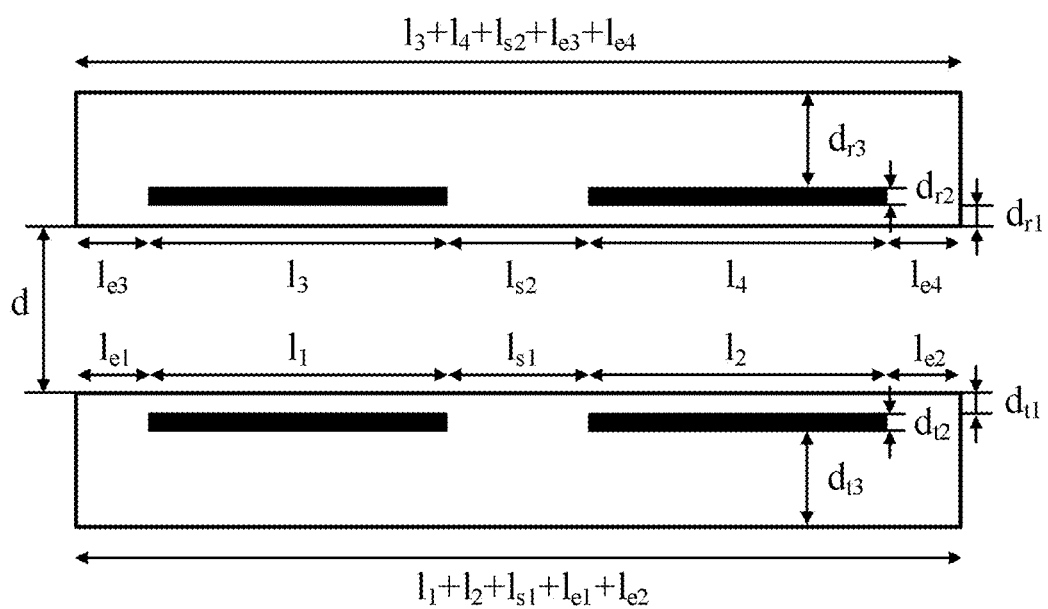
FIG. 3 is a schematic diagram of dimensions and placement of components of a coupler according to an embodiment of the present disclosure.

As shown in FIG. 3, in an embodiment, for the convenience of implementation, preferably, the first plate $P_1$, the second plate $P_2$, the third plate $P_3$, and the fourth plate $P_4$ are all square paralleled plates, with the size of the first plate $P_1$ being $I_1*I_1$, the size of the second plate $P_2$ being $I_2*I_2$, the size of the third plate $P_3$ being $I_3*I_3$, and the size of the fourth plate $P_4$ being $I_4*I_4$. Preferably, the thickness of the first plate $P_1$ and the second plate $P_2$ on the transmitting side are both $d_{r2}$, and the thickness of the third plate $P_3$ and the fourth plate $P_4$ on the receiving side are both $d_{r2}$. The length, width, and height of the first insulating cavity $I_1$ are $l_t*w_t*d_r$, and the length, width, and height of the second insulating cavity $I_2$ are $l_r*w_r*d_r$.

Preferably, the first plate $P_1$ and the second plate $P_2$ at the coupler transmitting side, and the third plate $P_3$ and the fourth plate $P_4$ at the coupler receiving side are all square in shape and have the same area. During the wireless power transfer process, the transmitting side directly faces the receiving side. Thus, the first plate $P_1$ directly faces the third plate $P_3$, the second plate $P_2$ directly faces the fourth plate $P_4$, and similarly, the first insulating cavity $I_1$ directly faces the second insulating cavity $I_2$. The transfer distance between the coupler transmitting side and the coupler receiving side is d.

Preferably, at the coupler transmitting side, the first plate $P_1$ and the second plate $P_2$ are arranged separately. The first plate $P_1$ and the second plate $P_2$ are horizontally aligned at a horizontal distance of $l_{s1}$. A distance between the first plate $P_1$ and an adjacent side of the first insulating cavity $I_1$ in the horizontal direction is $l_{e1}$, and a distance between the second plate $P_2$ and an adjacent side of the first insulating cavity $I_1$ is $l_{e2}$.

Preferably, the first plate $P_1$ and the second plate $P_2$ are equidistant from front, rear, left, and right sides of the first insulating cavity $I_1$. Obviously, $l_t=l_1+l_2+l_{s1}+l_{e1}+l_{e2}$, and $w_t=l_1+2*l_{e1}=l_2+2*l_{e2}$.

Preferably, at the coupler receiving side, the third plate $P_3$ and the fourth plate $P_4$ are arranged separately. The third plate $P_3$ and the fourth plate $P_4$ are horizontally aligned at a horizontal distance of $l_{s2}$. A distance between the third plate $P_3$ and an adjacent side of the second insulating cavity $I_2$ in the horizontal direction is $l_{e3}$, and a distance between the fourth plate $P_4$ and an adjacent side of the second insulating cavity $I_2$ is $l_{e4}$.

Preferably, the third plate $P_3$ and the fourth plate $P_4$ are equidistant from front, rear, left, and right sides of the second insulating cavity $I_2$. Obviously, $l_r=l_3+l_4+l_{s2}+l_{e3}+l_{e4}$, and $w_r=l_3+2*l_{e3}=l_4+2*l_{e4}$.

The transfer medium between the transmitting side and the receiving side is water, with a relative dielectric constant of 81. A side of the insulating cavity close to the transfer direction is referred to as an inner side, and a side far away from the transfer direction is referred to as an outer side. In this case, the thickness of the inner side of the first insulating cavity $I_1$ is $d_{t1}$ and the thickness of the outer side is $d_{t3}$, and the thickness of the inner side of the second insulating cavity $I_2$ is $d_{r1}$ and the thickness of the outer side is $d_{r3}$. Obviously, $d_t=d_{t1}+d_{t2}+d_{t3}$, and $d_r=d_{r1}+d_{r2}+d_{r3}$.

Preferably, the thickness of the insulating layer of the first insulating cavity $I_1$ facing the coupler receiving side is the same as the thickness of the insulating layer of the second insulating cavity $I_2$ facing the coupler transmitting side, and the thickness of the insulating layer of the first insulating cavity $I_1$ far away from the coupler receiving side is the same as the thickness of the insulating layer of the second insulating cavity $I_2$ far away from the coupler transmitting side, that is, $d_{t1}=d_r$, and $d_{t3}=d_{r3}$.

In an embodiment, $d_{t1}=d_{r1}$, and $d_{t3}=d_{r3}$. $d_{t1}$ and $d_{t3}$ only need to satisfy $d_{t1}<d_{t3}$, to meet the definition of the asymmetric insulating layer structure.

Figure 4:
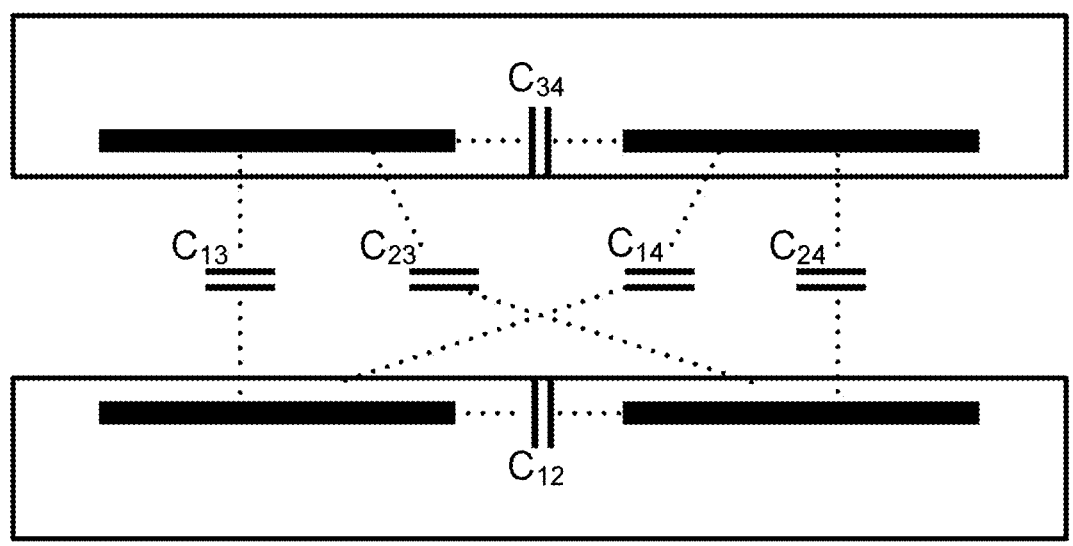
FIG. 4 is a schematic diagram of forming capacitance between plates of a coupler according to an embodiment of the present disclosure.

As shown in FIG. 4, a capacitor between the first plate $P_1$ and the second plate $P_2$ is defined as $C_{12}$, a capacitor between the first plate $P_1$ and the third plate $P_3$ is defined as $C_{13}$, a capacitor between the first plate $P_1$ and the fourth plate $P_4$ is defined as $C_{14}$, a capacitor between the second plate $P_2$ and the third plate $P_3$ is defined as $C_{23}$, a capacitor between the second plate $P_2$ and the fourth plate $P_4$ is defined as $C_{24}$, and a capacitor between the third plate $P_3$ and the fourth plate $P_4$ is defined as $C_{34}$. Thus, a total of six equivalent capacitors are produced among the four plates.

Figure 5:
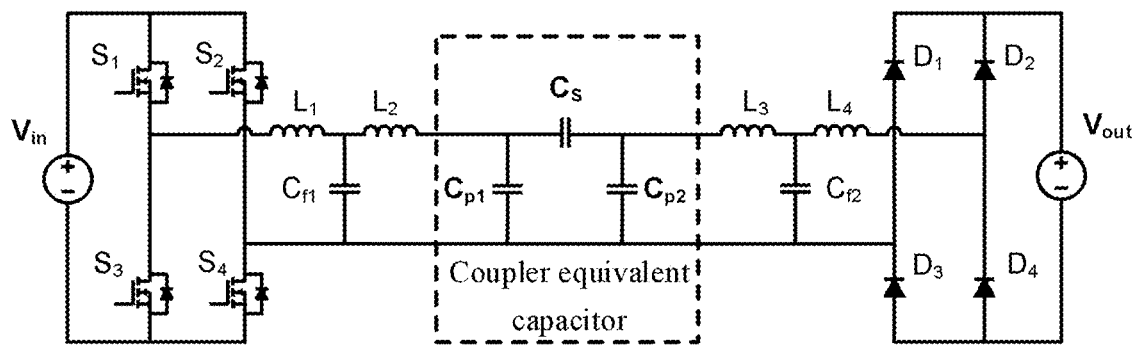
FIG. 5 is an equivalent circuit diagram of a coupler in circuits of a wireless power transfer system according to an embodiment of the present disclosure.

As shown in FIG. 5, based on the series and parallel relationships among the six capacitors, the six capacitors can be equivalently represented by three capacitors in the circuit: two parallel capacitors $C_{p1}$ and $C_{p2}$, and one series capacitor $C_S$. Calculation formulas are as follows:

$$C_S = \frac{C_{24}C_{13} - C_{14}C_{23}}{C_{13} + C_{14} + C_{23} + C_{24}};$$

$$C_{p1} = C_{12} - C_S + \frac{(C_{13} + C_{14})(C_{23} + C_{24})}{C_{13} + C_{14} + C_{23} + C_{24}};$$

and $$C_{p2} = C_{34} - C_S + \frac{(C_{13} + C_{23})(C_{14} + C_{24})}{C_{13} + C_{14} + C_{23} + C_{24}}.$$

The capacitive coupling coefficient is calculated based on the series and parallel capacitance values, using the following formula:

$$k_C = \frac{C_S}{\sqrt{(C_{p1} + C_S) \times (C_{p2} + C_S)}}.$$

It can be learned that if improving the coupling coefficient is the optimization goal of the coupler, it is necessary to increase capacitance value of the series capacitor $C_S$ or decrease capacitance values of the parallel capacitors $C_{p1}$ and $C_{p2}$. The capacitance value of the series capacitor is related to $C_{13}$, $C_{14}$, $C_{23}$, and $C_{24}$. $C_{13}$ and $C_{24}$ are capacitors between the opposite plates, and $C_{14}$ and $C_{23}$ are the cross-coupling capacitors. According to FIG. 4, these four capacitors are all in the transfer direction. Considering the universality of the coupler, the structure in the transfer direction is not modified. Therefore, in order to improve the coupling coefficient, it is necessary to reduce the capacitance values of the parallel capacitors $C_{p1}$ and $C_{p2}$.

The capacitance values of the parallel capacitors are related to $C_{12}$, $C_{34}$, $C_{13}$, $C_{14}$, $C_{23}$, and $C_{24}$. Considering the universality of the coupler, the capacitance values of the four capacitors $C_{13}$, $C_{14}$, $C_{23}$, and $C_{24}$ in the transfer direction are not changed. Therefore, the parallel capacitance value can only be reduced by reducing the capacitance values of $C_{12}$ and $C_{34}$, thus improving the coupling coefficient.

Based on the theory of the capacitor edge effect, the capacitance values of $C_{12}$ and $C_{34}$ are related to the transfer medium. A lower relative dielectric constant of the medium indicates a smaller capacitance value. In this embodiment, the first insulating cavity $I_1$ and the second insulating cavity $I_2$ are made of epoxy board with a relative dielectric constant of 4.4, and the transfer medium is fresh water with a relative dielectric constant of 81. Therefore, the thickness values of $d_{r1}$ and $d_{r3}$ determine the values of $C_{12}$ and $C_{34}$. Larger thickness values indicate smaller values of $C_{12}$ and $C_{34}$, and a larger coupling coefficient of the coupler. In order to ensure the power transfer capability of the coupler, the capacitance in the transfer direction cannot be changed, that is, $d_{r1}$ cannot be changed. Therefore, considering the universality of the coupler and to avoid affecting wireless power transfer, the present disclosure increases the thickness $d_{r3}$ of the insulating layer in the non-transfer direction, while keeping the thickness $d_{r1}$ of the insulating layer in the transfer direction unchanged. A larger $d_{r3}$ indicates a higher coupling coefficient and a better optimization effect. However, on the other hand, a larger $d_{r3}$ indicates overall greater thickness of the coupler. When applied, it may not be desirable to increase the volume of the coupler significantly while increasing the coupling coefficient. Therefore, in a preferred embodiment, di is 9 to 21 times of du. In another preferred embodiment, a better transfer performance can be achieved when $d_{r1}=1$ mm and $d_{r3}=15$ mm.

A wireless power transfer system according to an embodiment of the present disclosure includes: the capacitive coupler with asymmetric insulating layers according to any one of the above embodiments; a transmitter circuit including a power supply, an inverter, and a first compensation network, where an output terminal of the power supply is connected to an input terminal of the inverter, and an output terminal of the inverter is connected to the coupler transmitting side through the first compensation network; and a receiver circuit including a second compensation network and a rectifier, where the coupler receiving side is connected to the rectifier through the second compensation network.

Figure 6:
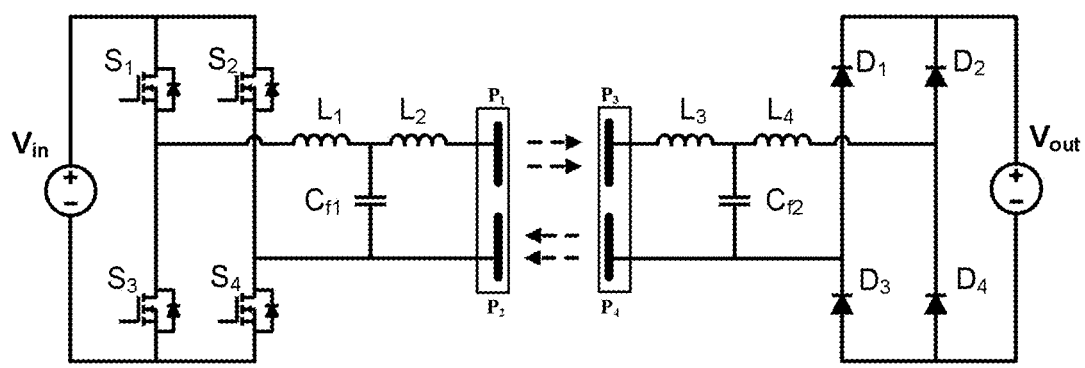
FIG. 6 is a schematic diagram of circuits of a wireless power transfer system according to an embodiment of the present disclosure.

As shown in FIG. 6, during wireless power transfer, the first plate $P_1$ and the second plate $P_2$ are connected to the transmitter circuit, and the third plate $P_3$ and the fourth plate $P_4$ are connected to the receiver circuit.

In an embodiment, parameters of the specific dimension of the coupler are as follows:

$l_1=l_2=l_3=l_4=150$ mm, $l_{s1}=l_{s2}=100$ mm, $l_{e1}=l_{e2}=20$ mm, $l_r=l_1+l_2+l_{s1}+l_{e1}+l_{e2}=440$ mm, and $wt=l_1+2*l_{e1}=l_2+2*l_{e2}=190$ mm. The thickness of the plates satisfy $d_{r2}=d_{r2}=3$ mm. The thickness of the inner sides of the first insulating cavity $I_1$ and the second insulating cavity $I_2$ satisfy $d_{r1}=d_{r1}=1$ mm. The thickness of the outer sides of the first insulating cavity $I_1$ and the second insulating cavity $I_2$ satisfy $d_{r3}=d_{r3}=15$ mm. The total thickness of the first insulating cavity $I_1$ and the second insulating cavity $I_2$ satisfy $d_r=d_r=d_{r1}+d_{r2}+d_{r3}=14$ mm.

The first insulating cavity $I_1$ and the second insulating cavity $I_2$ are made of epoxy board with a relative dielectric constant of 4.4. The transfer medium is fresh water with a relative dielectric constant of 81. The transfer distance satisfies d=50 mm.

The capacitance values of six equivalent capacitors between any two plates are obtained by finite element simulation. $C_{12}=45.999$ pF, $C_{13}=200.04$ pF, $C_{14}=45.23$ pF, $C_{23}=45.409$ pF, $C_{24}=199.98$ pF, and $C_{34}=46.034$ pF.

Based on the above six capacitance values, the series and parallel formulas are used to calculate the series and parallel capacitance values $C_S$, $C_{p1}$, and $C_{p2}$ in the equivalent circuit for wireless power transfer. The calculation formulas are as follows:

$$C_S = \frac{C_{24}C_{13} - C_{14}C_{23}}{C_{13} + C_{14} + C_{23} + C_{24}};$$

$$C_{p1} = C_{12} - C_S + \frac{(C_{13} + C_{14})(C_{23} + C_{24})}{C_{13} + C_{14} + C_{23} + C_{24}};$$

and $$C_{p2} = C_{34} - C_S + \frac{(C_{13} + C_{23})(C_{14} + C_{24})}{C_{13} + C_{14} + C_{23} + C_{24}}.$$

The series and parallel capacitance values are calculated: $C_S=77.35$ pF, $C_{p1}=91.32$ pF, and $C_{p2}=91.35$ pF.

The capacitive coupling coefficient is calculated based on the series and parallel capacitance values, using the following formula:

$$k_C = \frac{C_S}{\sqrt{(C_{p1} + C_S) \times (C_{p2} + C_S)}}.$$

The calculated capacitive coupling coefficient is $k_C=0.4586$.

As shown in FIG. 6, in the embodiments, a double-sided inductor-capacitor-inductor (LCL) compensation network is adopted, and parameters of other compensation networks of the wireless power transfer system are calculated based on the equivalent series and parallel capacitance values $C_{p1}$, $C_{p2}$, and $C_S$ of the coupler: $C_{f1}=C_{f2}=0.85$ nF, $L_1=L_4=29.7$ uH, and $L_2=L_3=219.9$ uH.

Figure 7:
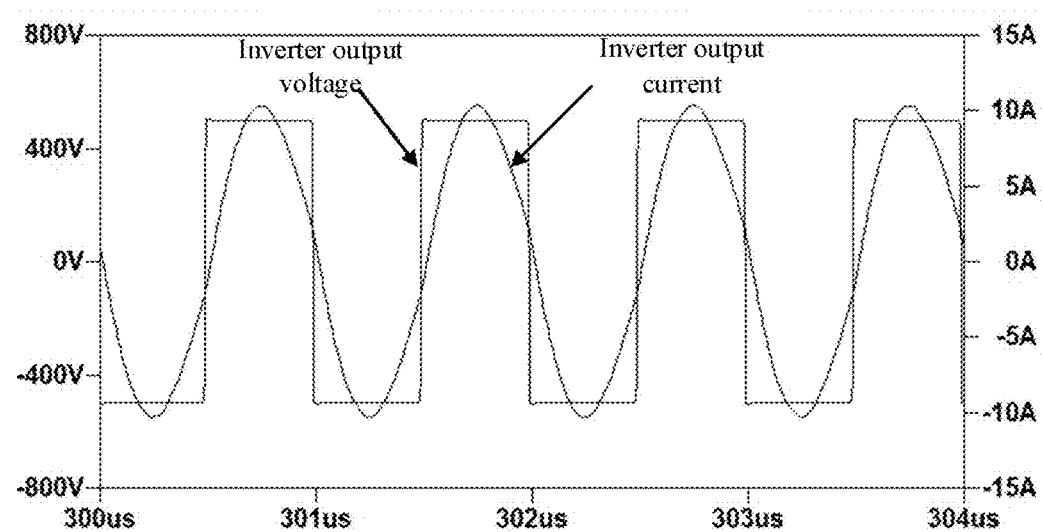
FIG. 7 is a waveform diagram of output voltage and current of an inverter of a coupler in circuits of a wireless power transfer system according to an embodiment of the present disclosure.
Figure 8:
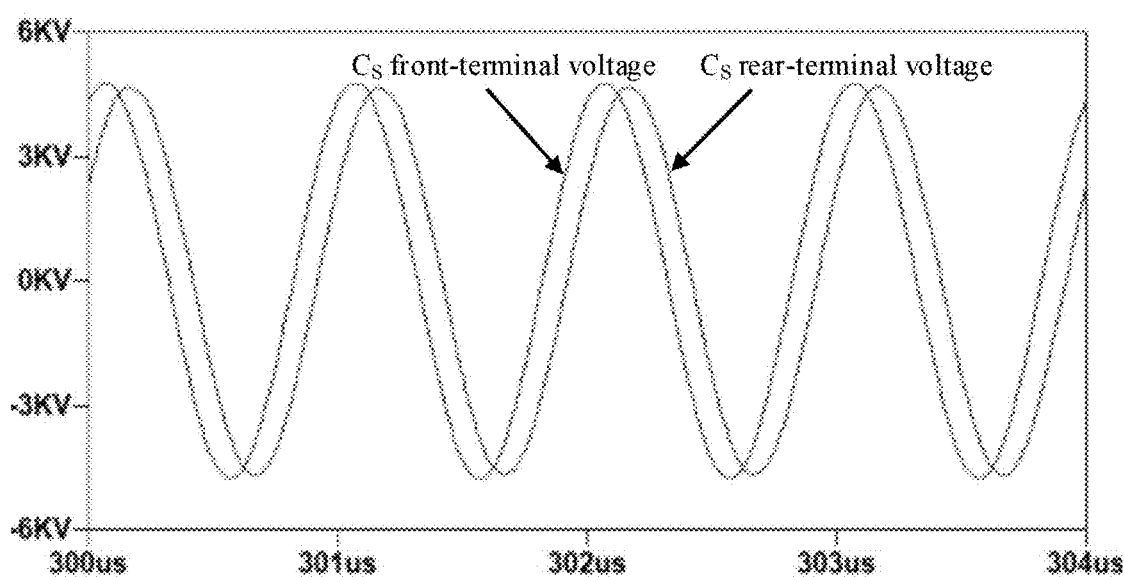
FIG. 8 is a waveform diagram of front-terminal and rear-terminal voltages of a coupler capacitor in circuits of a wireless power transfer system according to an embodiment of the present disclosure.
Figure 9:
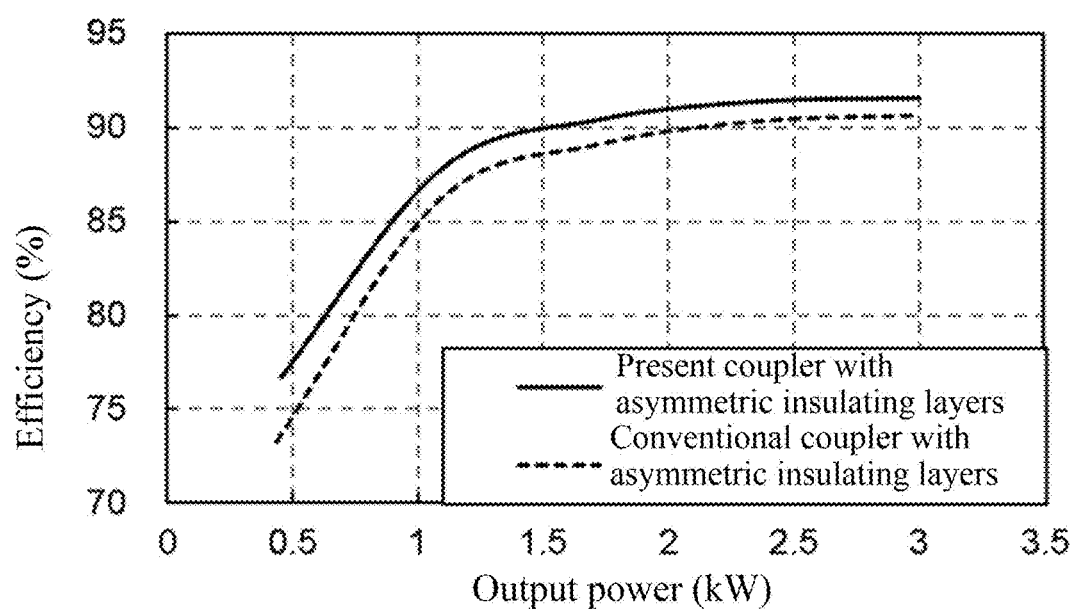
FIG. 9 is a comparison curve of operating efficiency of a coupler according to an embodiment of the present disclosure and a symmetric coupler in circuits of a wireless power transfer system.

Simulation software is used to simulate the system. The quality factors of Cfi, $C_{f2}$, and $L_1$-$L_4$ are all set to 500, the quality factors of $C_{p1}$, $C_{p2}$, and $C_S$ are all set to 100, and the inverter frequency is set to 1 MHz. As shown in FIG. 7, the output voltage of the inverter is a rectangular wave, and the output current is a sine wave. From the phase of the voltage and current, the inverter MOSFET realizes Zero-Voltage-Switching (ZVS) soft switching. As shown in FIG. 8, the front-terminal and rear-terminal voltages of the coupling capacitor are sine waves with equal amplitude and a phase difference of about 35.2 degrees. As shown in FIG. 9, the efficiency curve across the entire power range is obtained by adjusting the output power, with a peak efficiency of 91.6%.

To better demonstrate the advantages of the capacitive coupler with asymmetric insulating layers provided in the embodiments in terms of capacitive coupling coefficient and efficiency, in the comparative example, insulating layers at a transmitter terminal and a receiver terminal of the coupler are arranged as symmetrical structures. To be specific, the thickness of each side is exactly 1 mm. All other dimensions are identical to those of the capacitive coupler with asymmetric insulating layers provided in the embodiments. The insulating material is also epoxy board with a relative dielectric constant of 4.4, and the transfer medium is also fresh water with a relative dielectric constant of 81.

The capacitance values $C_{12}$ to $C_{34}$ of six equivalent capacitors between any two plates are obtained through finite element simulation: $C_{12}$=90.398 pF, $C_{13}$=263.08 pF, $C_{14}$=82.14 pF, $C_{23}$=82.139 pF, $C_{24}$=263.08 pF, and $C_{34}$=90.351 pF. Based on the above six capacitance values, the series and parallel capacitance values are calculated: $C_S$=90.47 pF, $C_{p1}$=172.54 pF, and $C_{p2}$=172.54 pF. The capacitive coupling coefficient is calculated according to the series and parallel capacitance values: $k_C$=0.344. It can be seen that the coupling coefficient is obviously smaller than that of the capacitive coupler with asymmetric insulating layers provided in the embodiments.

The double-sided LCL compensation network is also adopted, and parameters of other compensation networks of the wireless power transfer system are calculated based on the equivalent series and parallel capacitance values $C_{p1}$, $C_{p2}$, and $C_S$ of the coupler: $C_{f1}$=$C_{f2}$=1.3 nF, $L_1$=$L_4$=19.5 uH, and $L_2$=$L_3$=128.7 uH. Simulation software is used to simulate the system. The quality factors of $C_{f1}$, $C_{f2}$, and $L_1$-$L_4$ are all set to 500, the quality factors of $C_{p1}$, $C_{p2}$, and $C_S$ are all set to 100, and the inverter frequency is set to 1 MHz, which is consistent with those in simulation of the capacitive coupler with asymmetric insulating layers provided in the embodiments. As shown in FIG. 9, the efficiency curve across the entire power range is obtained by adjusting the output power, with a peak efficiency of 90.7%. The transfer efficiency in the entire power range is lower than that of the capacitive coupler with asymmetric insulating layers provided in the embodiments.

It can be seen that when the coupler dimension, compensation network type, device quality factor, inverter frequency, transfer distance, and other conditions are all the same, the capacitive coupling coefficient of the capacitive coupler with asymmetric insulating layers provided in the embodiments is significantly improved compared to conventional capacitive coupler. This improvement enhances the transfer efficiency of the system.

In conclusion, the capacitive coupler with asymmetric insulating layers provided in the embodiments achieves an electric field shielding effect comparable to that of the six-plate coupler in a simple and cost-effective manner without additional devices or wires. This enhances the safety of underwater wireless charging. In addition, the asymmetrical insulating layer structure improves the coupling coefficient of the coupler, thereby enhancing the transfer efficiency of the system. The conductive plates are fully protected by the insulating layer, providing waterproofing, corrosion resistance, electric shock prevention, and leakage prevention capabilities, and are capable of withstanding strong water pressure. Therefore, it is highly suitable for underwater wireless charging of electric ships.

The embodiments provide a typical application scenario of the capacitive coupler with asymmetric insulating layers, without limitation on the shape of the plates. As long as adhering to the relative positioning described in the embodiments, the plates fall within the protection scope of the present disclosure. It is also important to note that a basic wireless power transfer system includes a power supply, an inverter, a compensation network, a coupler, and a rectifier. The coupler proposed in the present disclosure is a component of this system and can be combined in various configurations with other components, offering multiple specific implementations. In the embodiments, a full-bridge inverter, a full-bridge rectifier, and a double-sided LCL compensation network are utilized. It's understood by those skilled in the art that other types of inverters, rectifiers, and compensation networks can also be combined with the coupler proposed in the present disclosure, all falling within the scope of protection of the present disclosure.

Described above are merely exemplary embodiments of the present disclosure, which cannot be construed as a limitation on the scope of the present disclosure. Any equivalent changes and modifications made in accordance with the teachings of the present disclosure still fall within the scope of the present disclosure. A person skilled in the art can easily think of other implementation solutions of the present disclosure after considering the specification and practicing the content disclosed herein. The present disclosure is intended to cover any variations, purposes or applicable changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the scope and spirit of the present disclosure are defined by the claims.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

It is easy for those skilled in the art to understand that the above-mentioned contents are merely the preferred examples of the present disclosure, and are not intended to limit the present disclosure. Any modifications, equivalent substitutions and improvements made within the spirit and principles of the present disclosure should fall within the protection scope of the present disclosure.

What is claimed is:

1. A capacitive coupler with asymmetric insulating layers, comprising:
   a coupler transmitting side, comprising a first insulating cavity, and a first plate and a second plate that are arranged on a first plane, wherein the first insulating cavity is configured to enclose the first plate and the second plate with an insulating material; and
   a coupler receiving side, arranged opposite to the coupler transmitting side and comprising a second insulating cavity, a third plate and a fourth plate that are arranged on a second plane, wherein the second insulating cavity is configured to enclose the third plate and the fourth plate with an insulating material, wherein thickness of an insulating layer of the first insulating cavity facing the coupler receiving side is smaller than thickness of an insulating layer of the first insulating cavity far away from the coupler receiving side; and thickness of an insulating layer of the second insulating cavity facing the coupler transmitting side is smaller than thickness of an insulating layer of the second insulating cavity far away from the coupler transmitting side.

2. The capacitive coupler with the asymmetric insulating layers according to claim 1, wherein the thickness of the insulating layer of the first insulating cavity facing the coupler receiving side is identical to the thickness of the insulating layer of the second insulating cavity facing the coupler transmitting side, and the thickness of the insulating layer of the first insulating cavity far away from the coupler receiving side is identical to the thickness of the insulating layer of the second insulating cavity far away from the coupler transmitting side.

3. The capacitive coupler with the asymmetric insulating layers according to claim 2, wherein the thickness of the insulating layer of the first insulating cavity facing the coupler receiving side is denoted as du, the thickness of the insulating layer of the first insulating cavity far away from the coupler receiving side is denoted as $d_{r3}$, and $d_{r3}$ is 9 to 21 times of $d_{r1}$.

4. The capacitive coupler with the asymmetric insulating layers according to claim 1, wherein the first plate, the second plate, the third plate, and the fourth plate are all square and have a same area, the first plate is arranged to face the third plate, the second plate is arranged to face the fourth plate, the first insulating cavity and the second insulating cavity have a same shape and area, and the first insulating cavity is arranged to face the second insulating cavity.

5. The capacitive coupler with the asymmetric insulating layers according to claim 4, wherein the first plate and the second plate are equidistant from front, rear, left, and right sides of the first insulating cavity, and the third plate and the fourth plate are equidistant from front, rear, left, and right sides of the second insulating cavity.

6. The capacitive coupler with the asymmetric insulating layers according to claim 1, wherein the first plate and the second plate are arranged separately, and the third plate and the fourth plate are arranged separately.

7. The capacitive coupler with the asymmetric insulating layers according to claim 1, wherein the first insulating cavity and the second insulating cavity are each an integrally formed rectangular parallelepiped structure or a rectangular parallelepiped structure formed by splicing a plurality of insulating plates.

8. The capacitive coupler with the asymmetric insulating layers according to claim 1, wherein both the first insulating cavity and the second insulating cavity are made of epoxy materials.

9. The capacitive coupler with the asymmetric insulating layers according to claim 1, wherein power transfer is transmitted from the coupler transmitting side to the coupler receiving side through a transfer medium.

10. A wireless power transfer system, comprising:

the capacitive coupler with the asymmetric insulating layers according to claim 1;

a transmitter circuit, comprising a power supply, an inverter, and a first compensation network, wherein an output terminal of the power supply is connected to an input terminal of the inverter, and an output terminal of the inverter is connected to the coupler transmitting side through the first compensation network; and a receiver circuit, comprising a second compensation network and a rectifier, wherein the coupler receiving side is connected to the rectifier through the second compensation network.

\* \* \* \* \*